(12) United States Patent
Lysenko et al.

(10) Patent No.: US 10,938,571 B2
(45) Date of Patent: Mar. 2, 2021

(54) SYSTEM AND METHOD FOR VERIFICATION OF DATA TRANSFERRED AMONG SEVERAL DATA STORAGES

(71) Applicant: Acronis International GmbH, Schaffhausen (CH)

(72) Inventors: Victor Lysenko, Moscow (RU); Stanislav Protasov, Moscow (RU); Mark Shmulevich, Moscow (RU); Serguei M Beloussov, Costa Del Sol (SG)

(73) Assignee: Acronis International GmbH, Schaffhausen (CH)

( * ) Notice: Subject to any disclaimer, the term of this patent is extended or adjusted under 35 U.S.C. 154(b) by 157 days.

(21) Appl. No.: 15/790,140

(22) Filed: Oct. 23, 2017

(65) Prior Publication Data

US 2018/0115428 A1  Apr. 26, 2018

Related U.S. Application Data

(60) Provisional application No. 62/412,995, filed on Oct. 26, 2016.

(51) Int. Cl.
*H04L 29/06* (2006.01)
*H04L 9/32* (2006.01)
*H04L 9/06* (2006.01)

(52) U.S. Cl.
CPC .......... *H04L 9/3247* (2013.01); *H04L 9/0637* (2013.01); *H04L 9/0643* (2013.01);
(Continued)

(58) Field of Classification Search
CPC . H04L 63/0876; H04L 63/0823; H04L 63/12; H04L 63/126; H04L 9/3242;
(Continued)

(56) References Cited

U.S. PATENT DOCUMENTS

| 2011/0113313 | A1* | 5/2011 | Thiesfeld | ............... | H03M 13/09 |
| | | | | | 714/807 |
| 2011/0313971 | A1* | 12/2011 | Hironaga | ............... | G06F 3/0617 |
| | | | | | 707/610 |

(Continued)

OTHER PUBLICATIONS

Matthew Vilim et al., Approximate Bitcoin Mining, Jun. 2016, ACM, pp. 1-6. (Year: 2016).*

(Continued)

*Primary Examiner* — Luu T Pham
*Assistant Examiner* — Fahimeh Mohammadi
(74) *Attorney, Agent, or Firm* — Arent Fox LLP; Michael Fainberg

(57) ABSTRACT

Disclosed are system and method for verification of data transferred among several data storages. An exemplary method includes: calculating first hash-sums of the data during an initial placement in a data storage; transmitting the first hash-sums to at least one blockchain network; detecting a transfer of the data to a new data storage; calculating second hash-sums of the data after a placement of the data in the new data storage; transmitting the second hash-sums to the at least one blockchain network; comparing the first and second hash-sums of the data; and determining data immutability after the transfer of the data from the data storage to the new data storage based at least on results of the comparing.

15 Claims, 7 Drawing Sheets

(52) U.S. Cl.
CPC ........ *H04L 9/3236* (2013.01); *H04L 63/0428* (2013.01); *H04L 63/123* (2013.01); *H04L 2209/38* (2013.01)

(58) Field of Classification Search
CPC ... H04L 9/3247; H04L 9/3268; H04L 9/0637; H04L 63/123; H04L 63/0428; H04L 9/3236; H04L 9/0643
See application file for complete search history.

(56) References Cited

U.S. PATENT DOCUMENTS

| | | | | |
|---|---|---|---|---|
| 2016/0112200 | A1* | 4/2016 | Kheterpal | H04L 9/0643 380/28 |
| 2016/0212146 | A1* | 7/2016 | Wilson | H04L 9/3226 |
| 2016/0292680 | A1* | 10/2016 | Wilson, Jr. | G06Q 20/40 |
| 2017/0075938 | A1* | 3/2017 | Black | G06F 21/602 |
| 2017/0180134 | A1* | 6/2017 | King | H04L 9/3247 |
| 2017/0228371 | A1* | 8/2017 | Seger, II | G06F 16/2379 |
| 2017/0249330 | A1* | 8/2017 | Chung | G06F 16/137 |
| 2017/0264428 | A1* | 9/2017 | Seger, II | G06F 16/13 |
| 2017/0300877 | A1* | 10/2017 | Mann | H04L 9/3239 |
| 2018/0006807 | A1* | 1/2018 | Suresh | H04L 9/0618 |
| 2018/0013567 | A1* | 1/2018 | Davis | H04L 9/0637 |
| 2018/0025181 | A1* | 1/2018 | Barinov | G06F 21/645 726/26 |
| 2018/0191502 | A1* | 7/2018 | Karame | G06F 21/6245 |
| 2018/0294955 | A1* | 10/2018 | Rhie | G06F 16/2272 |

OTHER PUBLICATIONS

Israa Alqassem et al., Towards Reference Architecture for Cryptocurrencies: Bitcoin Architectural Analysis, Sep. 1-3, 2014, IEEE, pp. 436-443. (Year: 2014).*

Christopher Jamthagen et al., Blockchain-based publishing layer for the Keyless Signing Infrastructure, Jul. 18-21, 2016, IEEE, pp. 374-381. (Year: 2016).*

Asma'a Ahmad et al., Establishing trust relationships in OppNets using Merkle trees, Jan. 5-10, 2016, IEEE, pp. 1-6. (Year: 2016 ).*

* cited by examiner

SYSTEM AND METHOD FOR VERIFICATION OF DATA TRANSFERRED AMONG SEVERAL DATA STORAGES

CROSS-REFERENCE TO RELATED APPLICATIONS

This application claims the benefit of U.S. Provisional Application No. 62/412,995, filed Oct. 26, 2016, which is hereby incorporated by reference.

FIELD OF TECHNOLOGY

The present disclosure generally relates to data storage and data transfer, and, more specifically to a method and system for verification of data that are transferred among several data storages.

BACKGROUND

Data transfer among different data storages is one of the common practices nowadays. For example, due to natural physical wear and tear of equipment, data stored on one data storage may be regularly transferred to a new physical storage in order to preserve data: either the new physical storage is a new drive with a higher data storage capacity, or a drive for storage of archival data (e.g., tape drives, optical drives etc.).

Data transfer may also be caused by changes in the relevance of the data. For example, historical or older data associated with a computing device may be moved to an archive, which is stored on a memory device with slower access speed. Alternatively, large amounts of data may necessitate data exchange among different public and private organizations (e.g., between insurance companies or banks).

A problem may occur during such data transfer when the amount of data is overwhelming, and when the transferred data may be accidentally or intentionally modified, damaged, tampered with or replaced by other data. Checking the integrity (e.g., confidence that a previously recorded transaction has not been modified) and immutability of data (changeability of, e.g., at least a portion or an aspect of a data object after it is created) during a data transfer may involve a fairly time-consuming and complicated process, especially if the amount of data reaches many hundreds of terabytes. In the meantime, the transferred data may contain critical information (e.g., financial, medical, research), and the like, damage of which may cause serious consequences.

It is therefore desirable to verify data integrity and data immutability during data transfers among different data storages.

SUMMARY

Disclosed herein are systems and methods for verification of data that are transferred among several data storages. In particular, an exemplary computer-implemented method includes calculating, by a processor, first hash-sums of the data during an initial placement in a data storage; transmitting the first hash-sums to at least one blockchain network; detecting a transfer of the data to a new data storage; calculating, by the processor, second hash-sums of the data after a placement of the data in the new data storage; transmitting the second hash-sums to the at least one blockchain network; comparing the first and second hash-sums of the data; and determining, by the processor, data immutability after the transfer of the data from the data storage to the new data storage based at least on results of the comparing.

In one exemplary aspect, the method further includes detecting an additional transfer of the data between two different data storages; calculating, by the processor, third hash-sums of the data during the additional transfer; and transmitting the third hash-sums of the data to the at least one blockchain network.

In one exemplary aspect, the method further includes recording transactions of the data in the at least one blockchain network in connection with a Merkle tree data structure, wherein the Merkle tree data structure comprises a root hash of the data and multiple row levels of hash data.

In one exemplary aspect, calculating, by the processor, the first, second, and third hash-sums of the data during each data transfer includes calculating hash-sums for each block of the data; and pairing and hashing the hash-sums for each block of the data to determine the root hash of data.

In one exemplary aspect, each of the first, second, and third hash-sums of the data during each data transfer is the root hash of the data.

In one exemplary aspect, determining, by the processor, the data immutability comprises detecting a change of the root hash after each data transfer based at least on comparing a new root hash calculated after the data being saved in the new data storage and a previous root hash that was recorded in the at least one blockchain network prior to the data transfer.

In one exemplary aspect, the at least one blockchain network comprises a plurality of computing nodes, each computing node being configured to maintain a copy of a continuously-growing list of data records saved in the at least one blockchain network.

In one exemplary aspect, a system for verification of data stored in multiple data storages includes a computer processor configured to: calculate first hash-sums of the data during an initial placement in a data storage; transmit the first hash-sums to at least one blockchain network; detect a transfer of the data to a new data storage; calculate second hash-sums of the data after a placement of the data in the new data storage; transmit the second hash-sums to the at least one blockchain network; compare the first and second hash-sums of the data; and determine data immutability after the transfer of the data from the data storage to the new data storage based at least on results of the comparing.

In one exemplary aspect, a non-transitory computer readable medium storing computer executable instructions for verification of data stored in multiple data storages, comprises instructions for: calculating, by a processor, first hash-sums of the data during an initial placement in a data storage; transmitting the first hash-sums to at least one blockchain network; detecting a transfer of the data to a new data storage; calculating, by the processor, second hash-sums of the data after a placement of the data in the new data storage; transmitting the second hash-sums to the at least one blockchain network; comparing the first and second hash-sums of the data; and determining, by the processor, data immutability after the transfer of the data from the data storage to the new data storage based at least on results of the comparing.

The above simplified summary of exemplary aspects serves to provide a basic understanding of the disclosure. This summary is not an extensive overview of all contemplated aspects, and is intended to neither identify key or critical elements of all aspects nor delineate the scope of any or all aspects of the disclosure. Its sole purpose is to present one or more aspects in a simplified form as a prelude to the more detailed description of the disclosure that follows. To the accomplishment of the foregoing, the one or more aspects of the disclosure include the features described and particularly pointed out in the claims. Moreover, it is understood that the individual limitations of elements of any of the disclosed methods, systems and software products may be combined to generate still further aspects without departing from the spirit of the present disclosure and the inventive concepts described herein.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects of the present disclosure are described herein in the context of systems, methods and non-transitory computer readable media comprising computer executable instructions for verification of data that are transferred among several data storages. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the exemplary aspects as illustrated in the accompanying drawings. The same reference indicators will be used to the extent possible throughout the drawings and the following description to refer to the same items.

Figure 1:
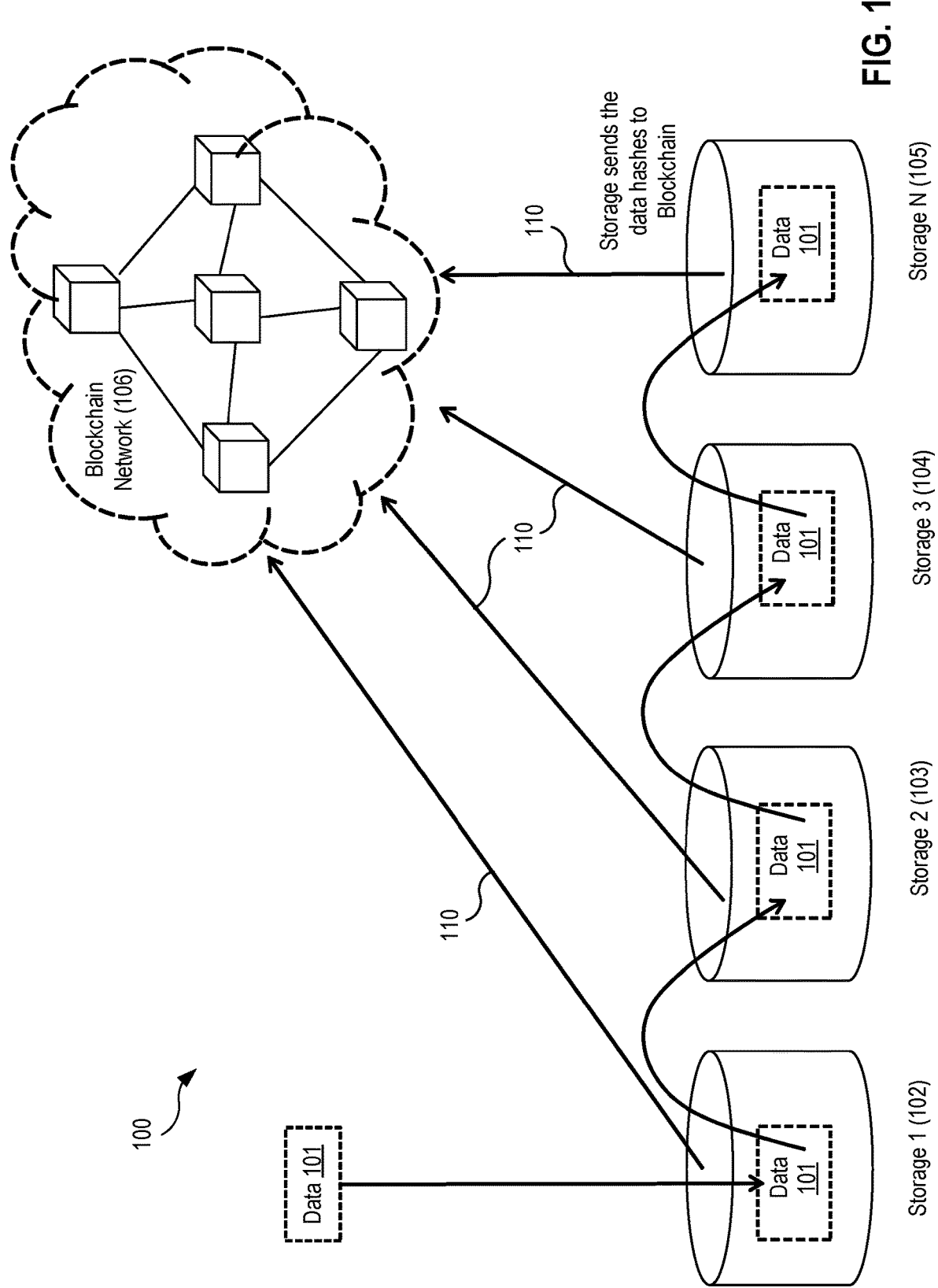
FIG. 1 illustrates a system for verification of data that are transferred among several data storages, according to aspects of the present disclosure.

FIG. 1 illustrates a system 100 for verification of data that are transferred among several data storages, according to aspects of the present disclosure. As shown in FIG. 1, initially, data 101 may be placed and stored in, e.g., a data repository 102 (storage 1) associated with a computing device or system (such as a computing system described later in conjunction with FIG. 7). Subsequently, data 101 may be transferred among different computing infrastructures and stored in corresponding data storage media (from storage 1 to storage N) due to, e.g., the replacement and upgrade of storage, data consolidation, server maintenance, and data center relocation. Conventional techniques and methods facilitating such data transfer may not be able to provide reliable and efficient integrated management, security, data mapping, and data validation in data transfer services, especially when the amount of data transferred is voluminous and overwhelming.

According to one exemplary aspect, for each block of the data during each data transfer, a hash function may be computed by at least one algorithm in a blockchain network, which may verify the data in terms of data integrity and immutability, and check data authenticity at any time. Blockchain, as referred herein, may include a data structure that stores a list of transactions regarding each data transfer and can be thought of as a distributed electronic ledger that records transactions between source identifier(s) and destination identifier(s). The transactions may be bundled into blocks and every block (except for the first block) may refer back to or may be linked to a prior block in the chain. Computer nodes of a blockchain network may be configured to maintain the blockchain and cryptographically validate each new block and thus the transactions contained in the corresponding block.

Figure 2:
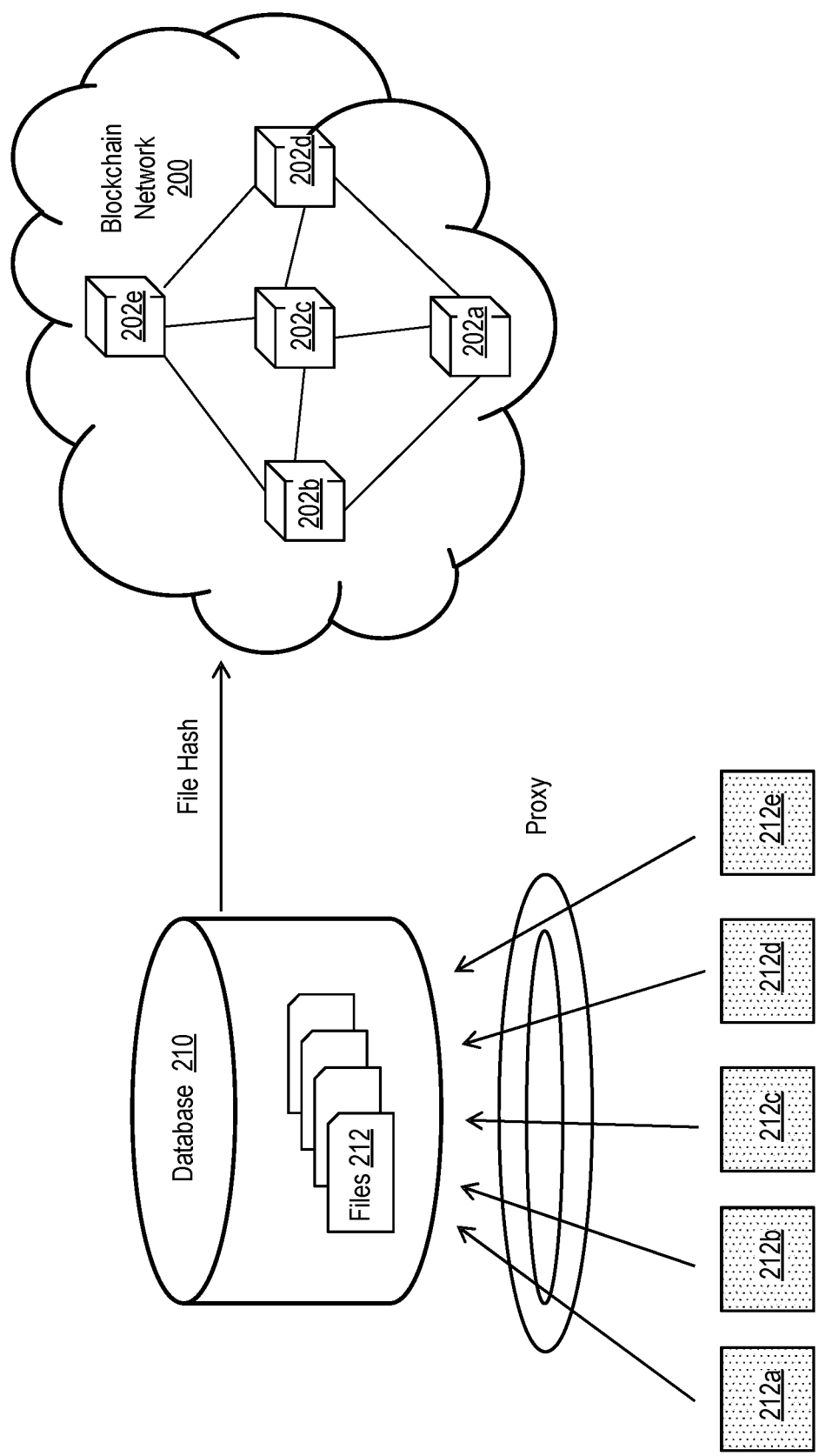
FIG. 2 illustrates a block diagram of an example of an existing system that stores hashes of data objects in a blockchain network.

For example, referring to FIG. 2, a blockchain network 200 may be implemented to store hashes or hash-sums of various data objects or files. A plurality of data objects, such as files 212a-212e, may be collectively stored in a database 210 as a set of files 212. Hashes for the files 212a-212e may be created and transmitted to blockchain network 200 for storage. Hashes (also referred to herein as "hash functions," "cryptographic hash functions," and the like) may include functions that map an initial input data set to an output data set. The output from a hash function may be referred to herein as a "hash identifier," "hash value," "hash data set," or simply, a "hash"). The blockchain network 200 may include a distributed network formed from a plurality of nodes or computers 202a-202e, for example. The blockchain network 200 may maintain a continuously-growing list of file hashes that may be configured to prevent tampering and revision and is composed of data structure blocks that exclusively hold the hashes of the files 212 received from the data storage 210. In some examples, every node (e.g., computers 202a-202e) in a decentralized system may have a copy of the growing blockchain in order to avoid the need to have a centralized database managed by a trusted third party. Moreover, each of the nodes 202a-202e may be configured to validate the data, add hash values thereof to their copy of the blockchain, and then broadcast these additions to other nodes using appropriate network communication protocols and channels.

It should be appreciated that, when the amount of data blocks, files, and the like, received by the database 210 becomes significant (e.g., hundreds or even thousands of records per second), the blockchain network 200 may not process all of these transactions since its capacity may be limited to a certain number of records in a given time period. Moreover, since each transaction stored using a blockchain network (e.g., blockchain network 200) incurs costs, it may become quite expensive when thousands or millions of data records are involved. To solve the problem, referring to FIG. 3, a system 300, including a computer 302, data storage 310, a blockchain network 330 and network 320, for verification of data that are transferred among several data storages using an improved blockchain technology may be implemented, according to aspects of the present disclosure. The details of the computer 302 will be discussed below with respect to FIG. 4, but generally the computer 302 is configured to manage the data storage process using CPU 304, which includes storing files 312 in data storage 310, generating hash values of the files 312 and creating a hash tree or Merkle tree, and transmitting the hash value(s) to the blockchain network 330 for storage thereon. According to the exemplary aspect, the computer 302 may be any type of computing device, such as a laptop, a desktop, a tablet, a mobile phone and the like. The specific hardware details of the exemplary computer 302 will be described below with respect to FIG. 7. It should be appreciated that, while a Merkle tree is disclosed for the exemplary aspect, other types of hash trees, such as a Merkle Patricia tree (or Merkle Patricia trie), may be used for such kinds of certificates in accordance with aspects of the present disclosure.

Figure 3:
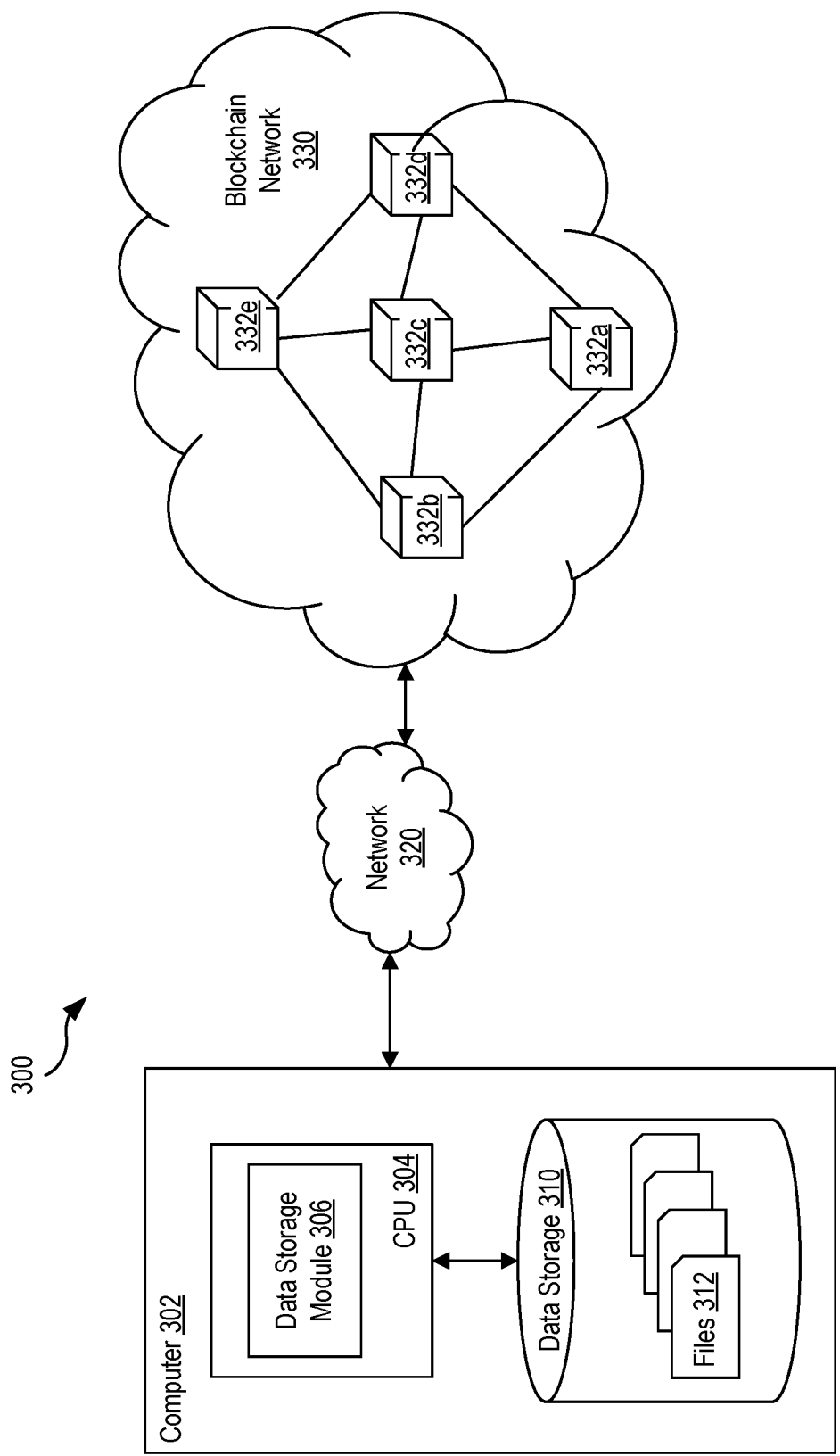
FIG. 3 illustrates a block diagram of a system for verification of data that are transferred among several data storages, according to an exemplary aspect of the present disclosure.

The data storage 310 of FIG. 3 may generally include hardware and software components configured to manage various storage resources within the computing environment. According to the exemplary aspect, data storage 310 may be a storage device of computer 302. For example, the data storage 310 may include one or more data storage devices (e.g., hard disk drives, optical drives, magnetic tape drives and/or the like) and storage management software that provides an interface to the one or more data storage devices. Alternatively, data storage 310 can be a storage device separately and communicatively coupled to computer 302, for example, by network 320. For example, the data storage 310 can be a data cloud storage service that facilitates temporary and/or permanent storage of computer data, including data files 312 of computer 302. The computer data of data files 312 may be any type of electronic, digital data generated and/or stored by a computer. That is, the computer data can represent text data, executable program code, audio, video or image data, or any other type of digital data. As will be discussed in detail below with respect to the exemplary algorithms, the computer 302, and more particularly data storage module 310, may be configured to calculate hash values of files stored thereon as part of a hash tree and transmit the root hash values to blockchain network 330.

According to an exemplary aspect, the blockchain network 330 can be an existing (public or private) distributed network formed from a plurality of nodes or computers 332a-332e, for example. The blockchain network 330 may maintain a continuously-growing list of data records that is configured to prevent tampering and revision and is composed of data structure blocks that exclusively hold the data received from the computer 302. In particular, after the data storage module 310 of computer 302 creates a root hash of the data files 312 (discussed in detail below) and transmits such root hash to the blockchain network 330, the transaction in the blockchain records blocks and confirms when and in what sequence the data transactions enter and are logged in the existing blockchain. In one example, every node (e.g., computers 332a-332e) in a decentralized system may have a copy of the growing blockchain in order to avoid the need to have a centralized database managed by a trusted third party. Moreover, each of the nodes 332a-332e may be configured to validate the data, add hash values to their copy of the blockchain, and broadcast these additions to other nodes using suitable network communication protocols and channels.

According to the exemplary aspect, the computer 302, the data storage 310 (optionally, if separate from the computer 302) and the blockchain network 330 may be configured to transmit data across network 320. The applicable network 320 can be any network for communicating data and data operations and can include a communication system (not shown) that connects the various components of the system shown in FIG. 3 by wire, cable, fiber optic, and/or wireless links facilitated by various types of well-known network elements, such as hubs, switches, routers, and the like. It should be appreciated that the network 320 may employ various well-known protocols to communicate information amongst the network resources. In one aspect, the network 320 can be part of the Internet or intranet using various communications infrastructure such as Ethernet, Wi-Fi and the like.

Figure 4:
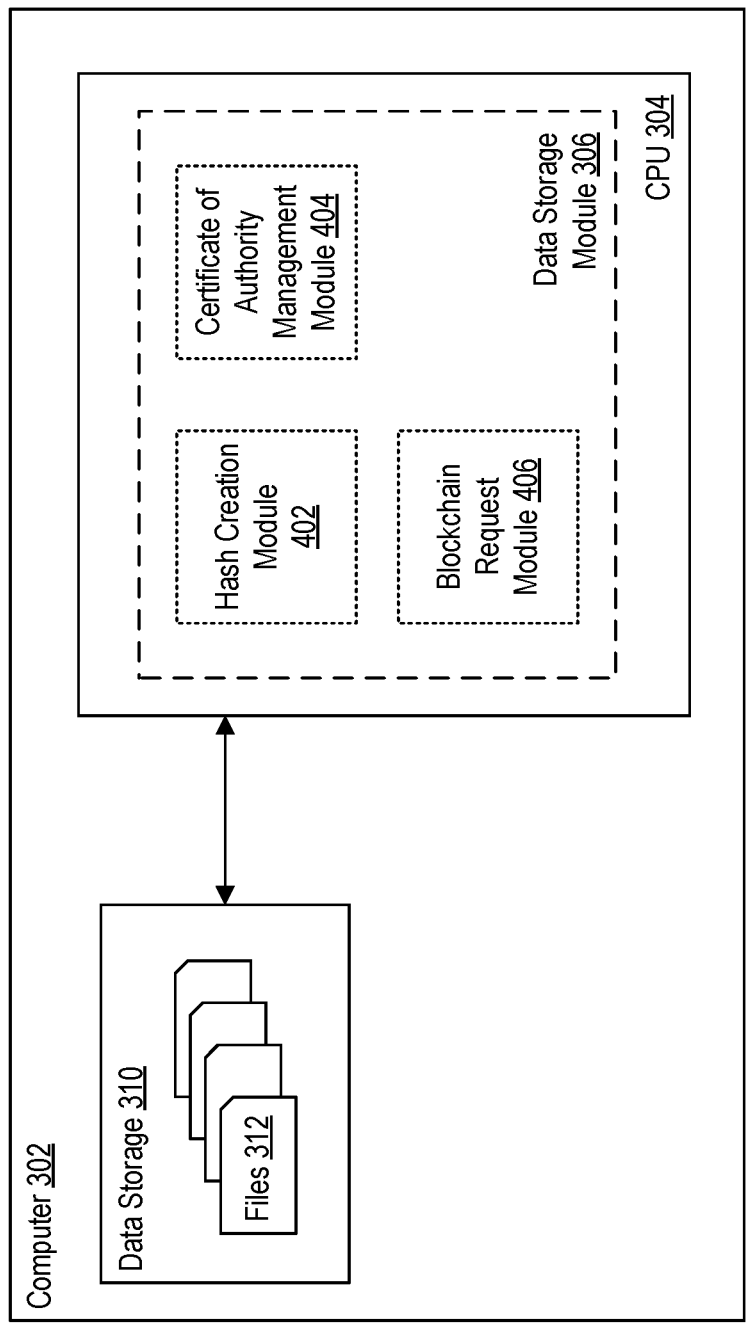
FIG. 4 illustrates a computer system shown in FIG. 3 for verification of data that are transferred among several data storages, according to an exemplary aspect of the present disclosure.

FIG. 4 illustrates a block diagram of the computer system 302 of FIG. 3 for verification of data that are transferred among several data storages, according to an exemplary aspect. As shown, the computer 302 may include a central processing unit ("CPU") 304 provided to, among other things, execute the data storage module 310, which is comprised of three sub-modules, including hash creation module 402, certificate of authority management module 404, and blockchain request module 406. In this aspect, the data storage module 310 and each of the sub-modules include software code (e.g., processor executable instructions) in memory, which may be configured to execute/facilitate the storing and managing of data files 312 according to an exemplary aspect, as will be discussed in more detail below.

In general, as used herein, the term "module" refers to a software service or application executed on one or more computers, including real-world devices, components, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer. Accordingly, each module can be realized in a variety of suitable configurations, and should not be limited to any example implementation exemplified herein.

For purposes of this disclosure below with respect to the exemplary algorithms, the disclosure generally refers to the computer 302 and/or one of the specific modules and sub-modules to perform the various steps of the algorithm.

As further shown in FIG. 4, the computer 302 may include data storage 310 (i.e., electronic memory) that stores the electronic data, for example, data files 312 as discussed above. In addition, data storage 310 is provided to store the hash value for each of the files (and combination of files, including the hash tree) created according to the exemplary aspects. The data storage 310 can be a computer-readable medium includes data storage, and, by way of example, and not limitation, can comprise RAM, ROM, EEPROM, CD-ROM, Flash memory or other types of electric, magnetic, or optical storage medium, or any other medium.

According to the exemplary aspect, when the amount of data transferred among different data storages using blockchain becomes fairly voluminous, an optimized system using a Merkle tree data structure may be implemented for recording transactions in blockchain, such that a hash of each block of the data being transferred is not recorded in blockchain. Rather, the derived hash from the sum of several hashes of lower level (hash from multiple hashes data, so-called "root hash") is recorded. For example, as shown FIG. 4, CPU 304 may be configured to execute the data storage module 310 and related sub-modules 402, 404, and 406. In particular, data storage module 310 may be configured to identify/obtain a plurality of files 312 from data storage 310 for verification of authenticity. Once these files 312 are identified, hash creation module 402 may be configured to generate hash values for each of the files 312. The hash values of the files 312 can also be stored in data storage 310. Next, the hash creation module 402 further groups the created hash values into sets of two or more has values (e.g., pairs of hash values are described according to the exemplary aspect) and adds the hash values for each grouping. Then, for each sum of hash values, the hash creation module 402 creates a hash value for that sum. The hash creation module 402 is configured to continue this process until a root hash value for the group of files 312 is created, effectively creating a hash tree that can be stored in data storage 310.

Furthermore, blockchain request module 406 may be configured to transmit the root hash value for the group of files 312 to the blockchain network 330 to be stored therein, as described above. As a result of this process, the system of FIG. 3, and, more particularly, computer 302, may be configured to obtain a confirmation of authenticity for data being transferred between different data storages.

According to the exemplary aspect, the authenticity of the data files 312 stored in the database (i.e., data storage 310) may be checked using the root-level hash generated by hash creation module 402 and stored in blockchain network 330. In order to check the authenticity of a file, computer 302, and, more particularly, certificate of authority management module 404, is configured to generate a certificate of authority for a target file. Although a certificate of authority may be generated using the whole hash tree in its entirety, it is preferable that the certificate of authority management module 404 only stores information relating to a chain of hashes for the file in order to reduce the size of such a certificate.

Figure 5:
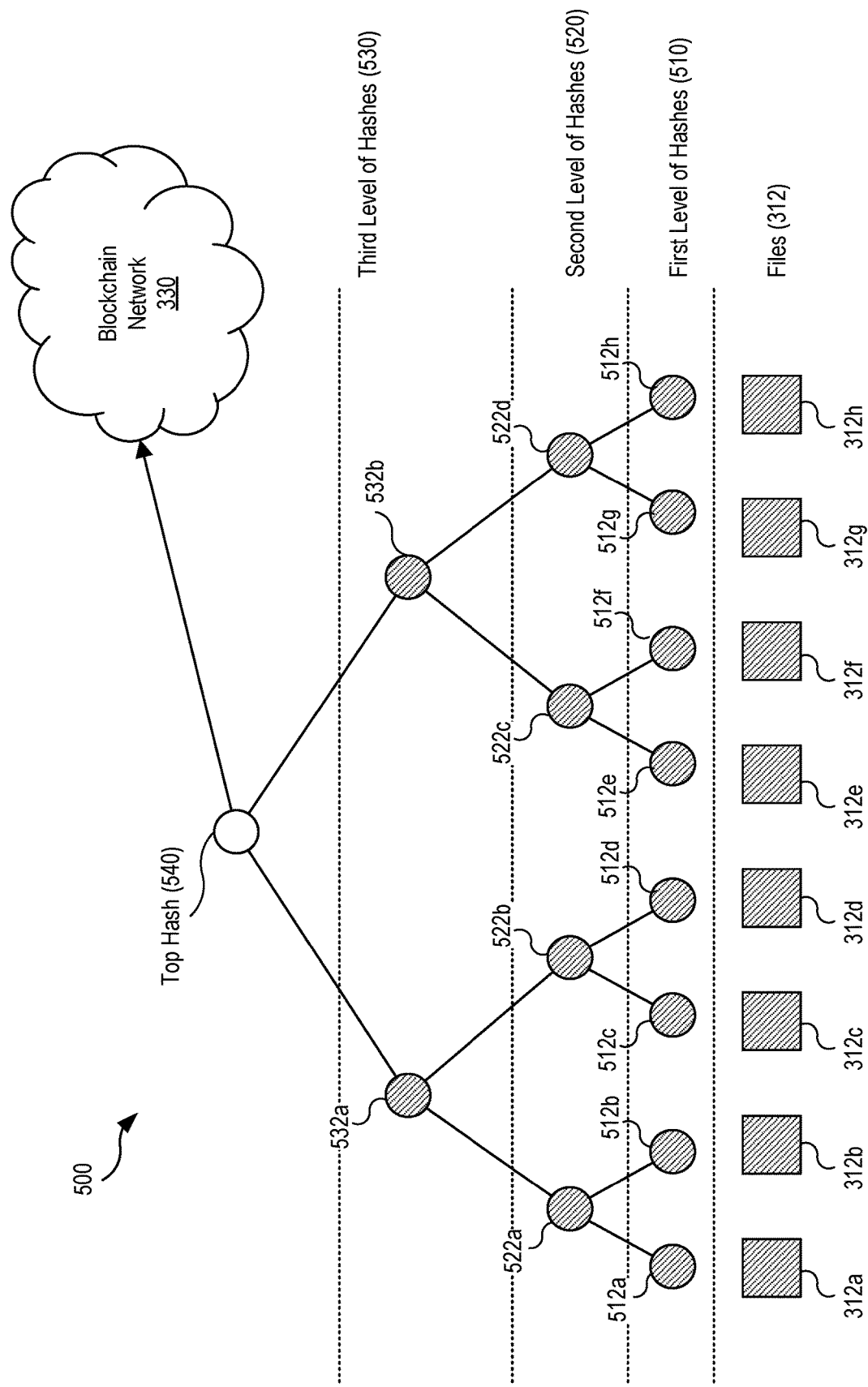
FIG. 5 illustrates a diagram of a hash tree, according to an exemplary aspect of the present disclosure.

FIG. 5 illustrates a diagram of a hash tree 500 illustrating the data verification method according to an exemplary aspect. In general, the hash tree 500 or Merkle tree is a tree-like data structure in which every non-leaf node is labelled with the hash of the labels or values (in case of leaves) of its child nodes. As such, hash trees may allow efficient and secure verification of the contents of large data structures and are a generalization of hash lists and hash chains.

According to the exemplary aspect, it should be understood that the hash tree 500 illustrates the organizational structure of files 312 identified for authentication and the corresponding levels of hash values as computed by hash creation module 402. As shown, files 312a through 312h may be identified/obtained by the computer 302 for the authentication algorithm. It should be appreciated than any number of files can be identified and processed according to the exemplary aspect. Once these files are obtained, the hash creation module 402 may generate a plurality of hash values 512a through 512h for each of the plurality of files 312a through 312h, respectively. The hash value of the data files 312a-312h may also be calculated using known values with the resulting value having a fixed size. For example, the hash value of the data file can be calculated using the MD5 hashing algorithm, resulting in a 128-bit hash value, or using the SHA-1 hashing algorithm, resulting in a 160-bit hash value. It should be appreciated that the disclosure is not limited to these two common hashing algorithms according to alternative aspects of the present disclosure.

As shown in FIG. 5, these hash values 512a through 512h may be determined to be part of a first level of hashes 510 according to the organizational structure. Next, the hash creation module 402 may group or divide the hash values 512a through 512h into a plurality of groupings (i.e., portions) with each grouping having at least two hash values. For example, the groupings are shown as four pairs: (i) pair 1: 512a and 512b; (ii) pair 2: 512c and 512d; (iii) pair 3: 512e and 512f; and (iv) pair 4: 512g and 512h. The pairings may be set arbitrarily, sequentially (in terms of timing for storage, or order of storage, or the like). Alternatively, each grouping may have more than two hash values.

After the hash creation module 402 groups the plurality of pairs of hash values, the hash creation module 402 may be further configured to add the hash values together in each grouping to generate a hash sum. In turn, the hash creation module 402 further computes a hash value for each sum. As shown, this next level of hash values is shown as a second level of hashes 520 and includes hash values 522a, 522b, 522c and 522d. Again, the hash creation module 402 is configured to group/divide these hash values 522a, 522b, 522c and 522d into pairs, for example. According to the exemplary aspect, the groupings are shown as two pairs: (i) pair: 522a and 522b; and (ii) pair 2: 522c and 522d. Each of these pairs can be added as a hash sum and then the hash creation module 402 can compute a hash value based on the hash sums, similarly to the process described above. The resulting hash values 532a and 532b are shown in the third level of hashes 530. The process is continued until a root hash value 540 for the grouping of files 312a through 312h is created. As further shown and described above, the blockchain request module 406 is configured to transmit the root hash value 540 for the group of files 312 to the blockchain network 330 to be stored therein. Thus, according to the exemplary aspect, the computer 302 using the algorithm based on the hash tree 500 can concurrently obtain a confirmation of authenticity for a plurality of files 312, while limiting the process to a single transaction in the blockchain network 330.

As further described above, the authenticity of a file can be checked using a certificate of authority for the target file. In some examples, the certificate of authority management module 404 may only store information relating to a chain of hashes for the file in order to reduce the size of such a certificate.

Referring back to FIG. 1, when the data 101 are moved from a first data storage 102 to and stored in a second data storage 103, hashes of the data 101 (or the root hash of the data 101) may be determined and transmitted to the blockchain network 106, as discussed previously and as depicted in FIG. 1 with transmissions 110.

Thereafter, a comparison may be performed by CPU 304 of the computer 302, as shown in FIG. 2, with respect to transaction data that are already stored in the first data storage 102 and need to be transferred to other data storages. Specifically, during a first data transfer, data integrity and immutability may be determined and monitored by the computer 302 of FIG. 4 to either confirm that data remain unchanged from the time of an initial placement between different data storages, or detect and record any changes to the data. This process may be repeated every time a data transfer occurs between different data storages. Thus, the verification of data may be carried out during any data transfer operation. Records of all transaction occurred during each data transfer may be transmitted and maintained in blockchain network 106 that serves as a reliable verification center and thus can surely confirm the absence or presence of changes in the stored data. Such check may be requested and performed by any interested person or entity, as the information of the recorded transaction is public.

Figure 6:
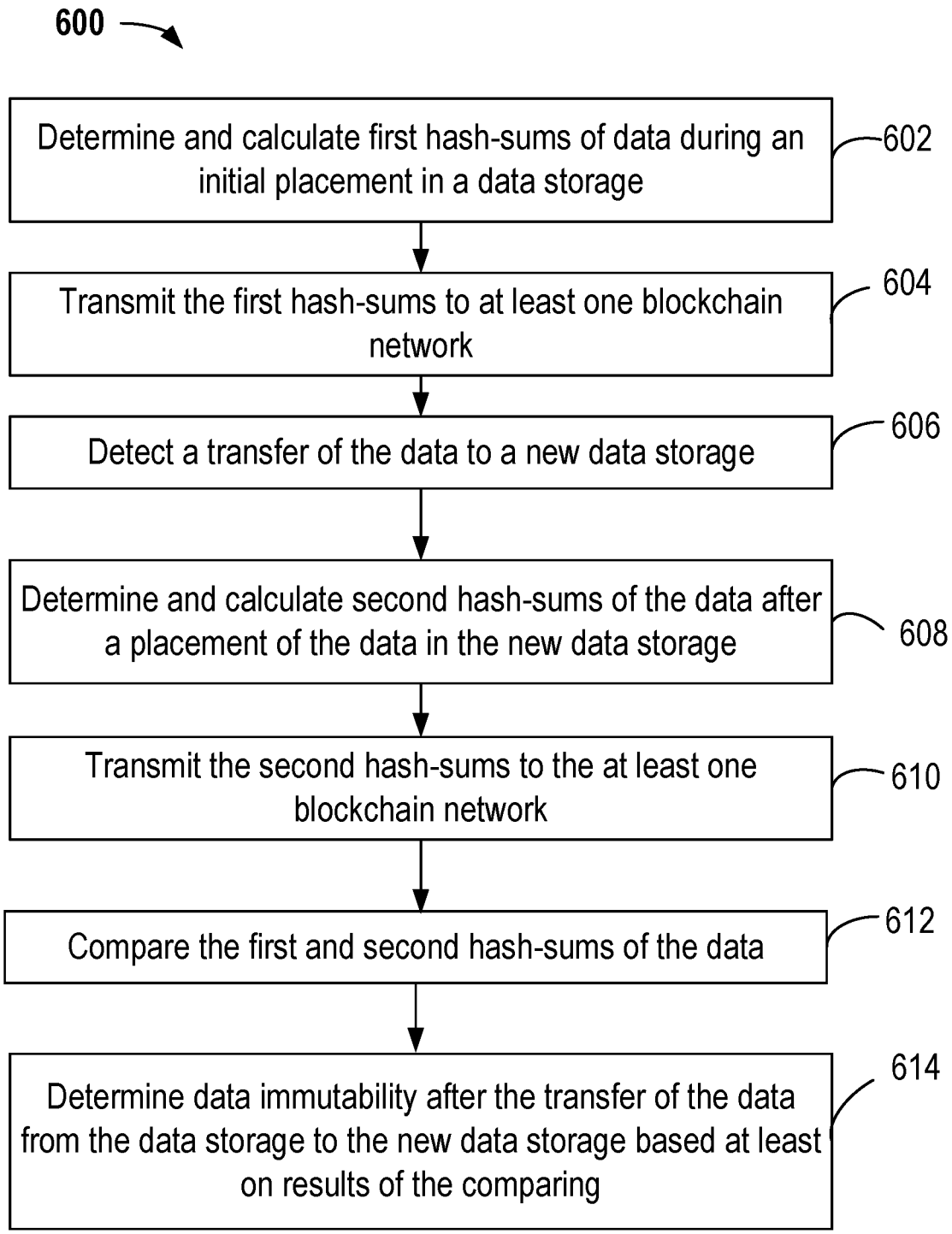
FIG. 6 illustrates a method for verification of data that are transferred among several data storages, according to an exemplary aspect.

FIG. 6 illustrates a flowchart for a method 600 for verification of data that are transferred among several data storages using blockchain technology, according to an exemplary aspect. As shown, initially, at step 602, the computer 302, and, more particularly, the hash creation module 402 of data storage module 310, may be configured to determine and calculate first hash-sums of the data during an initial placement in a data storage (e.g., data 101 being stored in data storage 102, as shown in FIG. 1). For example, the hash creation module 402 may create and compute a hash value for each block of the data 101. The hash values for the data files can be calculated using the MD5 hashing algorithm, resulting in a 128-bit hash value, or using the SHA-1 hashing algorithm, resulting in a 160-bit hash value. The resulting hash values for each of the files may be grouped together (for example in pairs) and a hash value for each grouping is calculated until a root hash of the data 101 is obtained. In other words, the hash creation module 402 may be configured to determine whether there is more than one hash value on the current level. If there is not, then the hash creation module 402 determines that the algorithm has reached the root level of the hash tree. The method then proceeds to step 604 where the blockchain request module 406 may transmit the root hash value 540 for the group of files 312 to the blockchain network 330 to be stored therein. At step 606, the data storage module 310 may detect a transfer of the data to a new data storage (e.g., from storage 102 to storage 103, as shown in FIG. 1). The hash creation module 402 then determines and calculates second hash-sums of the data after a placement of the data in the new data storage, at step 608, and the second hash-sums are transmitted to the blockchain network 330 (step 610). The certificate of authority management module 404 may be configured to compare the first and second hash-sums of the data (step 612), and determine data immutability after the transfer of the data from the data storage to the new data storage based at least on results of the comparing (step 614).

Figure 7:
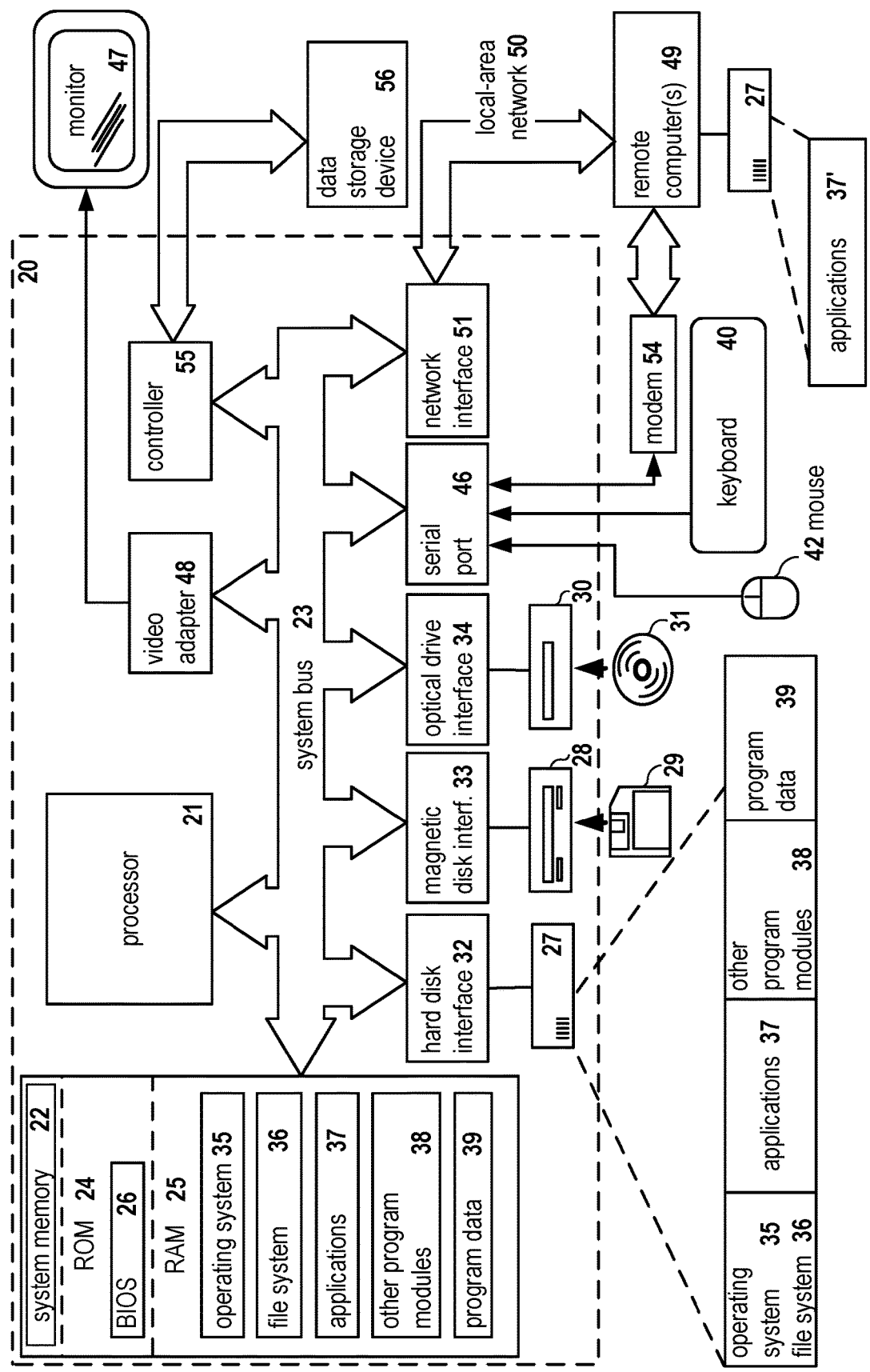
FIG. 7 is a block diagram of a general-purpose computer system on which the disclosed system and method can be implemented according to an exemplary aspect.

FIG. 7 is a block diagram illustrating a general-purpose computer system 20 on which aspects of systems and methods for verification of data that are transferred among several data storages using blockchain technology may be implemented in accordance with an exemplary aspect. It should be noted that the computer system 20 can correspond to the nodes 202, 332, and computer 302, for example, described earlier.

As shown, the computer system 20 (which may be a personal computer or a server) includes a central processing unit 21, a system memory 22, and a system bus 23 connecting the various system components, including the memory associated with the central processing unit 21. As will be appreciated by those of ordinary skill in the art, the system bus 23 may comprise a bus memory or bus memory controller, a peripheral bus, and a local bus that is able to interact with any other bus architecture. The system memory may include permanent memory (ROM) 24 and random-access memory (RAM) 25. The basic input/output system (BIOS) 26 may store the basic procedures for transfer of information between elements of the computer system 20, such as those at the time of loading the operating system with the use of the ROM 24.

The computer system 20, may also comprise a hard disk 27 for reading and writing data, a magnetic disk drive 28 for reading and writing on removable magnetic disks 29, and an optical drive 30 for reading and writing removable optical disks 31, such as CD-ROM, DVD-ROM and other optical media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the computer system 20.

An exemplary aspect comprises a system that uses a hard disk 27, a removable magnetic disk 29 and a removable optical disk 31 connected to the system bus 23 via the controller 55. It will be understood by those of ordinary skill in the art that any type of media 56 that is able to store data in a form readable by a computer (solid state drives, flash memory cards, digital disks, random-access memory (RAM) and so on) may also be utilized.

The computer system 20 has a file system 36, in which the operating system 35, may be stored, as well as additional program applications 37, other program modules 38, and program data 39. A user of the computer system 20 may enter commands and information using keyboard 40, mouse 42, or any other input device known to those of ordinary skill in the art, such as, but not limited to, a microphone, joystick, game controller, scanner, etc. Such input devices typically plug into the computer system 20 through a serial port 46, which in turn is connected to the system bus, but those of ordinary skill in the art will appreciate that input devices may be also be connected in other ways, such as, without limitation, via a parallel port, a game port, or a universal serial bus (USB). A monitor 47 or other type of display device may also be connected to the system bus 23 across an interface, such as a video adapter 48. In addition to the monitor 47, the personal computer may be equipped with other peripheral output devices (not shown), such as loudspeakers, a printer, etc.

Computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the computer system 20 may employ a modem 54 or other modules well known to those of ordinary skill in the art that enable communications with a wide-area computer network such as the Internet. The modem 54, which may be an internal or external device, may be connected to the system bus 23 by a serial port 46. It will be appreciated by those of ordinary skill in the art that said network connections are non-limiting examples of numerous well-understood ways of establishing a connection by one computer to another using communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure can be addressed in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a general purpose computer (such as the one described in greater detail in FIG. 7, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

What is claimed is:

1. A method for verification of data stored in multiple data storages, the method comprising:
    calculating, by a processor, a plurality of hash values for a plurality of data blocks comprised in the data;
    calculating, by the processor, first hash-sums of the data during an initial placement in a data storage, wherein the first hash-sums is calculated as a root hash of a Merkle tree data structure comprising the plurality of hash values when an amount of data blocks exceeds a threshold amount and wherein the first hash-sums remains as a set of individual hash values for data blocks when the amount of data blocks does not exceed the threshold amount;
    transmitting the first hash-sums to at least one blockchain network;
    in response to detecting a transfer of the data to a new data storage, calculating, by the processor, second hash-sums of the data after a placement of the data in the new data storage, wherein the second hash-sums is calculated as a root hash of another Merkle tree data structure comprising another plurality of hash values of the plurality of data blocks in the transferred data when the amount of data blocks exceeds the threshold amount and wherein the second hash-sums remains as a set of individual hash values for the data blocks in the transferred data when the amount of data blocks does not exceed the threshold amount;
    transmitting the second hash-sums to the at least one blockchain network;
    comparing the first and second hash-sums of the data; and
    verifying, by the processor, data immutability after the transfer of the data from the data storage to the new data storage based at least on results of the comparing;
    wherein the verifying comprises detecting a change of the root hash after each data transfer based at least on comparing a new root hash calculated after the data being saved in the new data storage and a previous root hash that was recorded in the at least one blockchain network prior to the data transfer.

2. The method according to claim 1, further comprising:
    detecting an additional transfer of the data between two different data storages;
    calculating, by the processor, third hash-sums of the data during the additional transfer; and
    transmitting the third hash-sums of the data to the at least one blockchain network.

3. The method according to claim 2, wherein calculating, by the processor, the first, second, and third hash-sums of the data during each data transfer comprises:
    calculating hash-sums for each block of the data; and
    pairing and hashing the hash-sums for each block of the data to determine the root hash of data.

4. The method according to claim 2, wherein each of the first, second, and third hash-sums of the data during each data transfer is the root hash of the data.

5. The method according to claim 1, wherein the at least one blockchain network comprises a plurality of computing nodes, each computing node being configured to maintain a copy of a continuously-growing list of data records saved in the at least one blockchain network.

6. A system for verification of data stored in multiple data storages, the system comprising:
    a computer processor configured to:
    calculate a plurality of hash values for a plurality of data blocks comprised in the data;
    calculate first hash-sums of the data during an initial placement in a data storage, wherein the first hash-sums is calculated as a root hash of a Merkle tree data structure comprising the plurality of hash values when an amount of data blocks exceeds a threshold amount and wherein the first hash-sums remains as a set of individual hash values for data blocks when the amount of data blocks does not exceed the threshold amount;
    transmit the first hash-sums to at least one blockchain network;
    in response to detecting a transfer of the data to a new data storage, calculate second hash-sums of the data after a placement of the data in the new data storage, wherein the second hash-sums is calculated as a root hash of another Merkle tree data structure comprising another plurality of hash values of the plurality of data blocks in the transferred data when the amount of data blocks exceeds the threshold amount and wherein the second hash-sums remains as a set of individual hash values for the data blocks in the transferred data when the amount of data blocks does not exceed the threshold amount;

transmit the second hash-sums to the at least one blockchain network;

compare the first and second hash-sums of the data; and determine verify data immutability after the transfer of the data from the data storage to the new data storage based at least on results of the comparing, wherein the verifying comprises detecting a change of the root hash after each data transfer based at least on comparing a new root hash calculated after the data being saved in the new data storage and a previous root hash that was recorded in the at least one blockchain network prior to the data transfer.

7. The system according to claim 6, wherein the computer processor is further configured to:

detect an additional transfer of the data between two different data storages;

calculate third hash-sums of the data during the additional transfer; and transmit the third hash-sums of the data to the at least one blockchain network.

8. The system according to claim 7, wherein, to calculate the first, second, and third hash-sums of the data during each data transfer, the computer processor is further configured to:

calculate hash-sums for each block of the data; and pair and hash the hash-sums for each block of the data to determine the root hash of data.

9. The system according to claim 7, wherein each of the first, second, and third hash-sums of the data during each data transfer is the root hash of the data.

10. The system according to claim 6, wherein the at least one blockchain network comprises a plurality of computing nodes, each computing node being configured to maintain a copy of a continuously-growing list of data records saved in the at least one blockchain network.

11. A non-transitory computer readable medium storing computer executable instructions for verification of data stored in multiple data storages, including instructions for:

calculating, by a processor, a plurality of hash values for a plurality of data blocks comprised in the data;

calculating, by the processor, first hash-sums of the data during an initial placement in a data storage, wherein the first hash-sums is calculated as a root hash of a Merkle tree data structure comprising the plurality of hash values when an amount of data blocks exceeds a threshold amount and wherein the first hash-sums remains as a set of individual hash values for data blocks when the amount of data blocks does not exceed the threshold amount;

transmitting the first hash-sums to at least one blockchain network;

in response to detecting a transfer of the data to a new data storage, calculating, by the processor, second hash-sums of the data after a placement of the data in the new data storage, wherein the second hash-sums is calculated as a root hash of another Merkle tree data structure comprising another plurality of hash values of the plurality of data blocks in the transferred data when the amount of data blocks exceeds the threshold amount and wherein the second hash-sums remains as a set of individual hash values for the data blocks in the transferred data when the amount of data blocks does not exceed the threshold amount;

transmitting the second hash-sums to the at least one blockchain network;

comparing the first and second hash-sums of the data; and verifying, by the processor, data immutability after the transfer of the data from the data storage to the new data storage based at least on results of the comparing, wherein the verifying comprises detecting a change of the root hash after each data transfer based at least on comparing a new root hash calculated after the data being saved in the new data storage and a previous root hash that was recorded in the at least one blockchain network prior to the data transfer.

12. The non-transitory computer readable medium according to claim 11, further comprising instructions for:

detecting an additional transfer of the data between two different data storages;

calculating, by the processor, third hash-sums of the data during the additional transfer;

transmitting the third hash-sums of the data to the at least one blockchain network.

13. The non-transitory computer readable medium according to claim 12, wherein the instructions for determining and calculating the first, second, and third hash-sums of the data during each data transfer further comprise instructions for:

determining and calculating hash-sums for each block of the data; and paring and hashing the hash-sums for each block of the data to determine the root hash of data.

14. The non-transitory computer readable medium according to claim 12, wherein each of the first, second, and third hash-sums of the data during each data transfer is the root hash of the data.

15. The non-transitory computer readable medium according to claim 11, wherein the at least one blockchain network comprises a plurality of computing nodes, each computing node being configured to maintain a copy of a continuously-growing list of data records saved in the at least one blockchain network.

\* \* \* \* \*